UNITED STATES PATENT OFFICE.

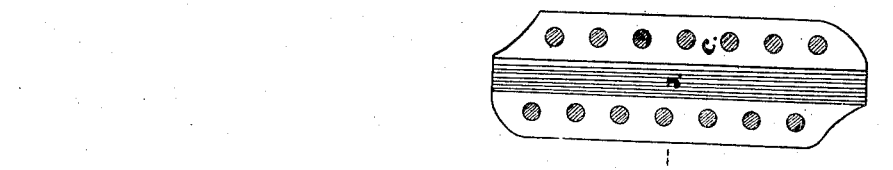
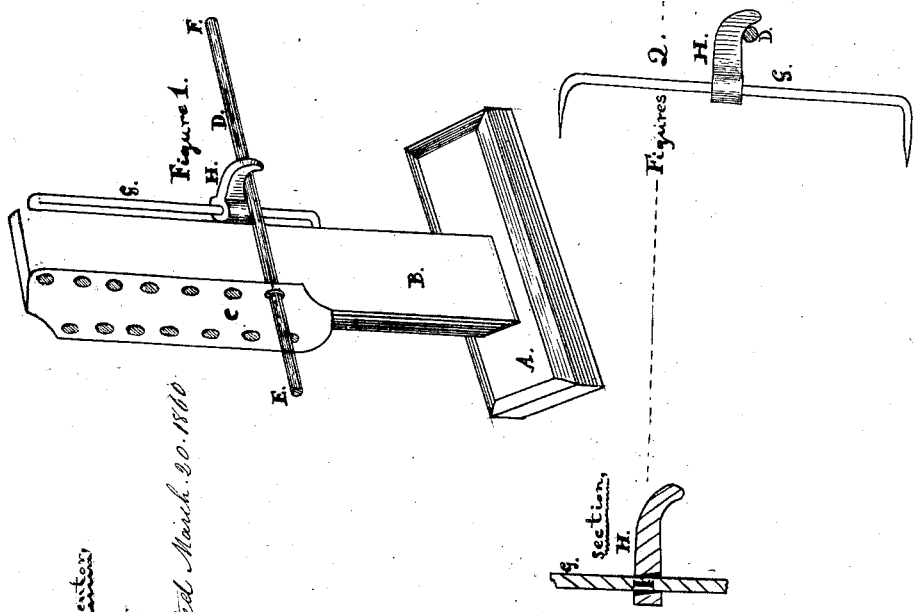

LUCIUS H. COLBY, OF GROTON, NEW YORK.

WAGON-JACK.

Specification of Letters Patent No. 27,525, dated March 20, 1860.

*To all whom it may concern:*

Be it known that I, LUCIUS H. COLBY, of the town of Groton, in the county of Tompkins and State of New York, have invented an Improvement in Wagon-Jacks; and I do hereby declare that the following is a full and exact description thereof, reference being had to the accompanying drawings, and to the letters of reference marked thereon, in which—

Figure 1, is a perspective view of my wagon jack; Fig. 2, are the essential parts thereof.

In Fig. 1, A, is the part which rests on the ground. B, is the upright or standard. C, is the plate full of holes, in which the lever D, acts; the hole in which said lever lies being the fulcrum of the said lever. E, is the end of the lever that receives the weight, or wagon; and F, is the end of the lever that receives the power applied to raise the wagon. G, is a rod or slide on which the hook H, slides up and down the said rod. The hook is represented as holding the lever, after the end of the axle of the wagon is raised.

In Fig. 2, H, is the hook, and it will be seen that when the lever D, is at the hook end of the hook, it clamps the rod or slide G, and when the lever is at the slide or rod end of the hook, the clamping of the said rod is so small as to permit the hook to pass up or down the same. This clamping of the rod or slide is represented at I. C, is the plate full of holes, and their arrangement alternately is plainly seen; the space J, being the bearing on the standard B, with the rows of holes on opposite side of the said standard. It will also be noticed that the rod or slide is round, for the purpose of permitting the hook to hold the lever on either side of the said standard; and that the holes in the said plate are alternately a little higher in each opposite series, as well as the beveling opposite ends of the said plate, to mark for the eye, the relative higher or lower position of the opposite holes.

The use of the described mechanism is sufficiently plain; except to call the attention to the necessity that the lever be at the end of the hook in order to produce the clamping of the slide as described.

It is not designed to claim the use of a plate with holes in the same; nor of rack, nor of levers, nor to the mere mechanical elements described, but What I do claim as my invention, and desire to secure by Letters Patent is, 1. The described hook and slide, for the purpose of holding the lever in its place, at any desirable position or altitude, when raising the wagon wheel off the ground.

2. I claim the so making the hook shaped pawl, that it shall clamp the rod by its leverage on the rod or slide; and further its turning on the said rod for the purpose of suiting the lever, when in either series of holes in the plate, as described.

3. I claim the combination as a whole when composed of the standard, the plate with double series of holes, the lever, the slide or rod, the hooked pawl, clamping by its leverage, at any point, on the rod or slide, by the action of the said lever; when the said combination is made and operated as described.

Ithaca, Feb. 13th 1860.

LUCIUS H. COLBY.

Witnesses:
S. J. PARKER,
GEORGE W. THOMAS.